(12) United States Patent
Yuan et al.

(10) Patent No.: US 12,399,248 B2
(45) Date of Patent: Aug. 26, 2025

(54) DEVICE AND METHOD FOR MEASURING AZIMUTH ANGLE AND ELEVATION ANGLE OF MID-INFRARED LASER LIGHT

(71) Applicant: Shanxi University, Shanxi (CN)

(72) Inventors: Jinpeng Yuan, Taiyuan (CN); Lirong Wang, Taiyuan (CN); Ning Liu, Taiyuan (CN)

(73) Assignee: Shanxi University, Taiyuan (CN)

( * ) Notice: Subject to any disclaimer, the term of this patent is extended or adjusted under 35 U.S.C. 154(b) by 106 days.

(21) Appl. No.: 18/431,601

(22) Filed: Feb. 2, 2024

(65) Prior Publication Data
US 2025/0116748 A1    Apr. 10, 2025

(51) Int. Cl.
*G01S 3/781* (2006.01)
*G01S 3/782* (2006.01)
(52) U.S. Cl.
CPC .............. *G01S 3/781* (2013.01); *G01S 3/782* (2013.01)
(58) Field of Classification Search
CPC .................................. G01S 3/781; G01S 3/782
See application file for complete search history.

(56) References Cited

U.S. PATENT DOCUMENTS

2021/0033686 A1*   2/2021   Garces Malonda ... G01K 13/00

* cited by examiner

*Primary Examiner* — Hina F Ayub
(74) *Attorney, Agent, or Firm* — Renner, Otto, Boisselle & Sklar, LLP

(57) ABSTRACT

The present disclosure relates to a device and method for accurately measuring an azimuth angle and an elevation angle of mid-infrared laser light. The device includes a laser, an atomic gas cell, a filter, a displacement platform, and a beam mass spectrometer. Pump light generated by the laser enters the atomic gas cell along an optical axis which is a Z-axis for a spontaneous frequency conversion process, and a generated reference beam enters the beam mass spectrometer through the filter; target mid-infrared laser light and the pump light intersect in the atomic gas cell to induce a second frequency conversion process, and a generated beam to be measured enters the beam mass spectrometer through the filter; and the beam mass spectrometer is arranged on the displacement platform and simultaneously detect spot images of the reference beam and the beam to be measured at different positions, respectively.

8 Claims, 5 Drawing Sheets

DEVICE AND METHOD FOR MEASURING AZIMUTH ANGLE AND ELEVATION ANGLE OF MID-INFRARED LASER LIGHT

CROSS REFERENCE TO RELATED APPLICATION

This patent application claims the benefit and priority of Chinese Patent Application No. 2023112830572, filed with the China National Intellectual Property Administration on Oct. 7, 2023, the disclosure of which is incorporated by reference herein in its entirety as part of the present application.

TECHNICAL FIELD

The present disclosure relates to the field of mid-infrared detection, and in particular, to a device and method for accurately measuring an azimuth angle and an elevation angle of mid-infrared laser light.

BACKGROUND

Mid-infrared detection is widely used in the technical fields of material processing, aerospace, laser remote sensing, spectral diagnosis, biomedicine, even national defense, and the like, and has become one of the important strategic support technologies. Positioning of mid-infrared laser light plays an extremely important role in atmospheric remote sensing measurement, robot infrared laser navigation, laser three-dimensional holographic projection technologies, and infrared laser directional confrontation. Therefore, it is of great significance to accurately measure an azimuth angle and an elevation angle of mid-infrared laser light.

Conventional measurement of an azimuth angle and an elevation angle of mid-infrared laser light is generally performed by direct detection, for example, by a mid-infrared laser probe, a mid-infrared detector, and a mid-infrared camera. When mid-infrared radiation is performed on a surface of the probe, a sensitive layer of the probe absorbs infrared photons, which leads to excitation of electrons in a photosensitive material for subsequent imaging. The principle of the infrared detector or camera is similar to that of the probe, that is, by absorbing mid-infrared radiation and converting the mid-infrared radiation into electrical signals. However, the above methods all have the shortcomings of being high in cost, being likely to be affected by an environment, and having low detection sensitivity and large measurement errors during calibration of mid-infrared laser light.

SUMMARY

To overcome the shortcomings existing in the prior art and solve the technical problems, the present disclosure provides a mid-infrared detection method based on frequency up-conversion, which can implement a device and method for measuring an azimuth angle and an elevation angle of mid-infrared laser light stably at a low cost and in high sensitivity and high precision.

To solve the technical problems, the technical solution used by the present disclosure is as follows: A device for measuring an azimuth angle and an elevation angle of mid-infrared laser light includes a laser, an atomic gas cell, a filter, a displacement platform, and a beam mass spectrometer, where pump light generated by the laser enters the atomic gas cell along an optical axis which is a Z-axis for a spontaneous frequency conversion process, and a generated reference beam enters the beam mass spectrometer through the filter; target mid-infrared laser light and the pump light intersect in the atomic gas cell to induce a second frequency conversion process, and a generated beam to be measured enters the beam mass spectrometer through the filter; and the beam mass spectrometer is arranged on the displacement platform and is configured to move along the optical axis which is the Z-axis under driving of the displacement platform, and simultaneously detect spot images of the reference beam and the beam to be measured at different positions, respectively.

The device for measuring an azimuth angle and an elevation angle of mid-infrared laser light further includes a calculation unit, where the calculation unit is configured to calculate an azimuth angle and an elevation angle of the target mid-infrared laser light based on displacements of the beam to be measured in an X direction and a Y direction relative to the reference beam in the spot images at different positions of the optical axis.

The device for measuring an azimuth angle and an elevation angle of mid-infrared laser light further includes a display screen configured to display a measured spot image and calculated azimuth angle and elevation angle information of the mid-infrared laser light.

Formulas for calculating the azimuth angle and the elevation angle of the target mid-infrared laser light are as follows:

$$\left(\frac{2\pi}{\lambda_{5233}}\cos\rho\right)^2 = \left(2\frac{2\pi}{\lambda_{778}}\right)^2 + \left(\frac{2\pi}{\lambda_{420}}\cos\left(\arctan\frac{\sin\theta h}{d}\right)\right)^2 -$$
$$2\left(2\frac{2\pi}{\lambda_{778}}\right)\frac{2\pi}{\lambda_{420}}\cos\left(\arctan\frac{\sin\theta h}{d}\right)\cos(\arctan d/l); \text{ and}$$

$$\left(\frac{2\pi}{\lambda_{420}}\cos\left(\arctan\frac{\sin\theta h}{d}\right)\right)^2 =$$
$$\left(2\frac{2\pi}{\lambda_{778}}\right)^2 + \left(\frac{2\pi}{\lambda_{5233}}\cos\rho\right)^2 - 4\frac{2\pi}{\lambda_{778}}\frac{2\pi}{\lambda_{5233}}\cos\rho\cos\varphi,$$

where $\rho$ and $\varphi$ represent the azimuth angle and the elevation angle of the target mid-infrared laser light, respectively; $\lambda_{5233}$, $\lambda_{778}$ and $\lambda_{420}$ represent wavelengths of the target mid-infrared laser light, the pump light and the beam to be measured, respectively, $\theta$ represents an azimuth angle of the beam to be measured, $\theta$=arc tan d/l, l represents displacements of the beam mass spectrometer during the two measurements, and d and h represent displacements of the beam to be measured in the X direction and the Y direction relative to the reference beam in the spot images obtained by the two measurements, respectively.

The device for measuring an azimuth angle and an elevation angle of mid-infrared laser light further includes a half-wave plate and a polarizing beam splitter, where the half-wave plate and the polarizing beam splitter form an adjustable beam-splitting device configured to adjust an intensity of the pump light entering the atomic gas cell.

The pump light has a wavelength of 778 nm, the reference beam and the beam to be measured have a wavelength of 420 nm, the target mid-infrared laser light has a wavelength of 5,233 nm, and atoms in the atomic gas cell are rubidium atoms.

The filter has a central wavelength of 420 nm and a bandwidth of 10 nm.

In addition, the present disclosure further provides a method for measuring an azimuth angle and an elevation angle of mid-infrared laser light, which is implemented based on the above device, including the following steps:

S1: placing the device on a path of target mid-infrared laser light so that the target mid-infrared laser light and pump light intersect in the atomic gas cell;

S2: obtaining spot images of a reference beam and a beam to be measured by the beam mass spectrometer;

S3: moving the beam mass spectrometer by means of the displacement platform to obtain spot images of the reference beam and the beam to be measured again; and S4: calculating an azimuth angle of the beam to be measured based on the spot images obtained twice and a moving distance of the displacement platform, and then calculating an azimuth angle and an elevation angle of the target mid-infrared laser light based on the azimuth angle of the beam to be measured, with calculation formulas as follows:

$$\left(\frac{2\pi}{\lambda_{5232}}\cos\rho\right)^2 = \left(2\frac{2\pi}{\lambda_{778}}\right)^2 + \left(\frac{2\pi}{\lambda_{420}}\cos\left(\arctan\frac{\sin\theta h}{d}\right)\right)^2 -$$

$$2\left(2\frac{2\pi}{\lambda_{778}}\right)\frac{2\pi}{\lambda_{420}}\cos\left(\arctan\frac{\sin\theta h}{d}\right)\cos(\arctan d/l); \text{ and}$$

$$\left(\frac{2\pi}{\lambda_{420}}\cos\left(\arctan\frac{\sin\theta h}{d}\right)\right)^2 =$$

$$\left(2\frac{2\pi}{\lambda_{778}}\right)^2 + \left(\frac{2\pi}{\lambda_{5233}}\cos\rho\right)^2 - 4\frac{2\pi}{\lambda_{778}}\frac{2\pi}{\lambda_{5233}}\cos\rho\cos\varphi,$$

where $\rho$ and $\varphi$ represent the azimuth angle and the elevation angle of the target mid-infrared laser light, respectively; $\lambda_{5233}$, $\lambda_{778}$ and $\lambda_{420}$ represent wavelengths of the target mid-infrared laser light, the pump light and the beam to be measured, respectively, $\theta$ represents the azimuth angle of the beam to be measured, $\theta$=arc tan d/l, l represents displacements of the beam mass spectrometer during the two measurements, and d and h represent displacements of the beam to be measured in the X direction and the Y direction relative to the reference beam in the spot images obtained by the two measurements, respectively.

Compared with the prior art, the present disclosure has the following beneficial effects:

1. The present disclosure provides a device and method capable of accurately measuring an azimuth angle and an elevation angle of mid-infrared laser light, which apply a frequency up-conversion technology to detection of mid-infrared laser light, convert azimuth angle and elevation angle information of target mid-infrared laser light into angle information of a beam to be measured in a visible light band by using a directional relationship between the beam to be measured in the visible light band and the target mid-infrared laser light in frequency up-conversion, and use a conventional detector in the visible light band for efficient detection, and can determine an azimuth of the beam to be measured by analyzing a reference beam and the beam to be measured with the same wavelength that are detected at two different positions on an optical axis, thereby accurately measuring the azimuth angle and the elevation angle of the target mid-infrared laser light, and solving the problems that existing means of detecting mid-infrared laser light, such as a photoelectric detector or a beam mass spectrometer, have extremely low detection efficiency, are complex to operate, and are high in cost.

2. According to the present disclosure, the frequency up-conversion of single-wavelength laser pumping ensures stability of a reference signal, and strict phase matching conditions ensure accuracy of the azimuth angle information, and the device and method have the advantages of low cost, stability, high sensitivity, high precision, and the like. Experimental results prove that the present disclosure will become a favorable tool for measuring the azimuth of the mid-infrared laser light.

1: Semiconductor laser, 2: Half-wave plate, 3: Polarizing beam splitter, 4: Target mid-infrared laser light, 5: Atomic gas cell, 6: Narrow-band filter, 7: Displacement platform, 8: Beam mass spectrometer, 9: Calculation unit, 10: Position information extraction unit, 11: Angle calculation unit, 12: Display screen.

DETAILED DESCRIPTION OF THE EMBODIMENTS

To make the objectives, technical solutions and advantages of embodiments of the present disclosure clearer, the technical solutions in the embodiments of the present disclosure will be described clearly and completely below. Obviously, the embodiments described are only some of, rather than all of, the embodiments of the present disclosure. All other embodiments obtained by those of ordinary skill in the art based on the embodiments of the present disclosure without creative efforts shall fall within the protection scope of the present disclosure.

Embodiment 1

Figure 1:
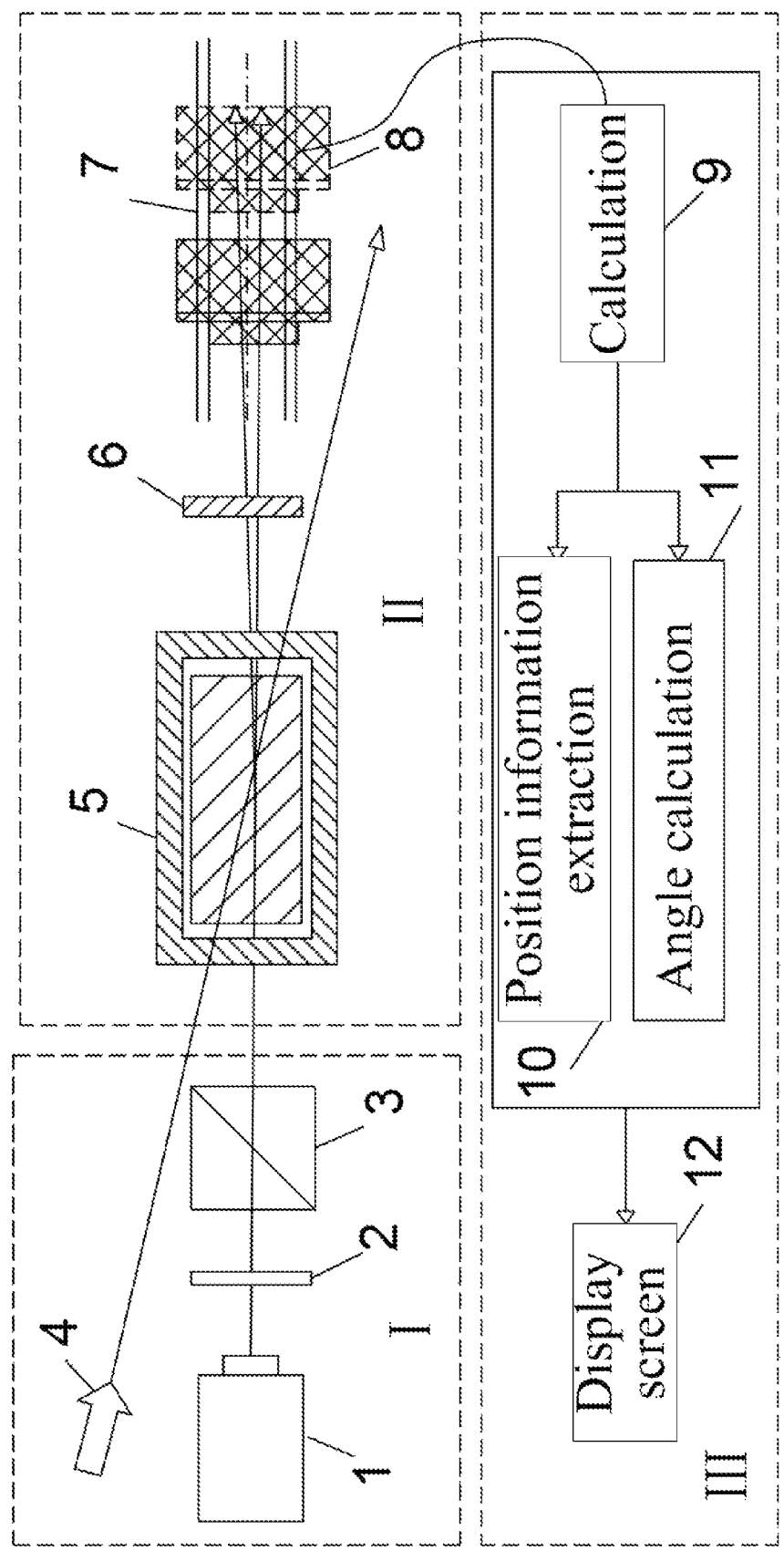
FIG. 1 is a schematic structural diagram of a device for measuring an azimuth angle and an elevation angle of mid-infrared laser light according to an embodiment of the present disclosure.

As shown in FIG. 1, Embodiment 1 of the present disclosure provides a device for measuring an azimuth angle and an elevation angle of mid-infrared laser light, including a laser 1, an atomic gas cell 5, a filter 6, a displacement platform 7, and a beam mass spectrometer 8. Pump light generated by the laser 1 enters the atomic gas cell 5 along an optical axis which is a Z-axis for a spontaneous frequency conversion process, and a generated reference beam passes through the filter 6 and then enters the beam mass spectrometer 8; target mid-infrared laser light 4 and pump light intersect in the atomic gas cell 5 to induce a second frequency conversion process, and a generated beam to be measured passes through the filter 6 and then enters the beam mass spectrometer 8; and the beam mass spectrometer 8 is arranged on the displacement platform 7 and is configured to move along the optical axis which is the Z-axis under driving of the displacement platform 7, and simultaneously detect spot images of the reference beam and the beam to be measured at different positions, respectively.

Further, the device for measuring an azimuth angle and an elevation angle of mid-infrared laser light according to this embodiment further includes a calculation unit 9, where the calculation unit 9 is configured to calculate an azimuth angle and an elevation angle of the target mid-infrared laser light 4 based on displacements of the beam to be measured in an X direction and a Y direction relative to the reference beam in the spot images at different positions of the optical axis. Specifically, the calculation unit 9 includes a position information extraction module 10 and an angle calculation unit 11, where the former is configured to extract position information of the reference beam and the beam to be measured at two different positions, and the latter is configured to calculate the azimuth angle and the elevation angle of the target mid-infrared laser light 4 based on the extracted position information.

Further, the device in this embodiment further includes a display screen 12 configured to display a measured spot image and calculated azimuth angle and elevation angle information of the mid-infrared laser light.

Further, the device in this embodiment further includes a half-wave plate 2 and a polarizing beam splitter 3, where the half-wave plate 2 and the polarizing beam splitter 3 form an adjustable beam-splitting device configured to adjust an intensity of the pump light entering the atomic gas cell 5.

Further, in this embodiment, the pump light has a wavelength of 778 nm, the reference beam and the beam to be measured have a wavelength of 420 nm, the target mid-infrared laser light 4 has a wavelength of 5,233 nm, and atoms in the atomic gas cell 5 are rubidium atoms. The laser 1 is specifically a semiconductor laser.

Further, in this embodiment, the filter 6 is a narrow-band filter having a central wavelength of 420 nm and a bandwidth of 10 nm.

A measurement principle of the present disclosure is described below.

Pump light emitted by the laser passes through the half-wave plate and the polarizing beam splitter, and two frequency conversion processes occur in the atomic gas cell, resulting in a reference beam caused by the spontaneous process and a beam to be measured caused by the target mid-infrared laser light. The displacement platform 7 accurately controls the beam mass spectrometer 8 to move along the optical axis which is the Z-axis to effectively detect a signal of the reference beam and a signal of the beam to be measured to obtain spot images.

The first frequency conversion process is a spontaneous frequency conversion process, which is specifically a monochromatic two-photon transition process occurring in rubidium atoms. The 778 nm pump light emitted by the laser 1 acts on the atomic gas cell 5, thereby implementing virtual level transition of the rubidium atoms in the atomic gas cell 5 from a ground state $5S_{1/2}$ to an excited state $5D_{5/2}$, and then implementing transition from a $5D_{5/2}$ state to a $6P_{3/2}$ state to radiate 5,233 nm infrared light. A 420 nm blue beam generated by this spontaneous process is in the same direction as the pump light, and is used as the reference beam for position calibration in the embodiment of the present disclosure.

The second frequency conversion process is the frequency conversion process induced by the target mid-infrared laser. The 5,233 nm target mid-infrared laser light and a single beam of 778 nm pump light intersect in the atomic gas cell 5 to interact with the rubidium atoms. Specifically, the single beam of 778 nm pump light acts on the atomic gas cell, thereby implementing virtual level transition of the rubidium atoms from the ground state $5S_{1/2}$ to the excited state $5D_{5/2}$, and then induces the second frequency conversion process with the target 5,233 nm laser light to generate a second 420 nm blue beam. The beam is in a direction related to the direction of the target mid-infrared laser light, and thus is used as the beam to be measured in the direction of the target mid-infrared laser light.

Figure 2:
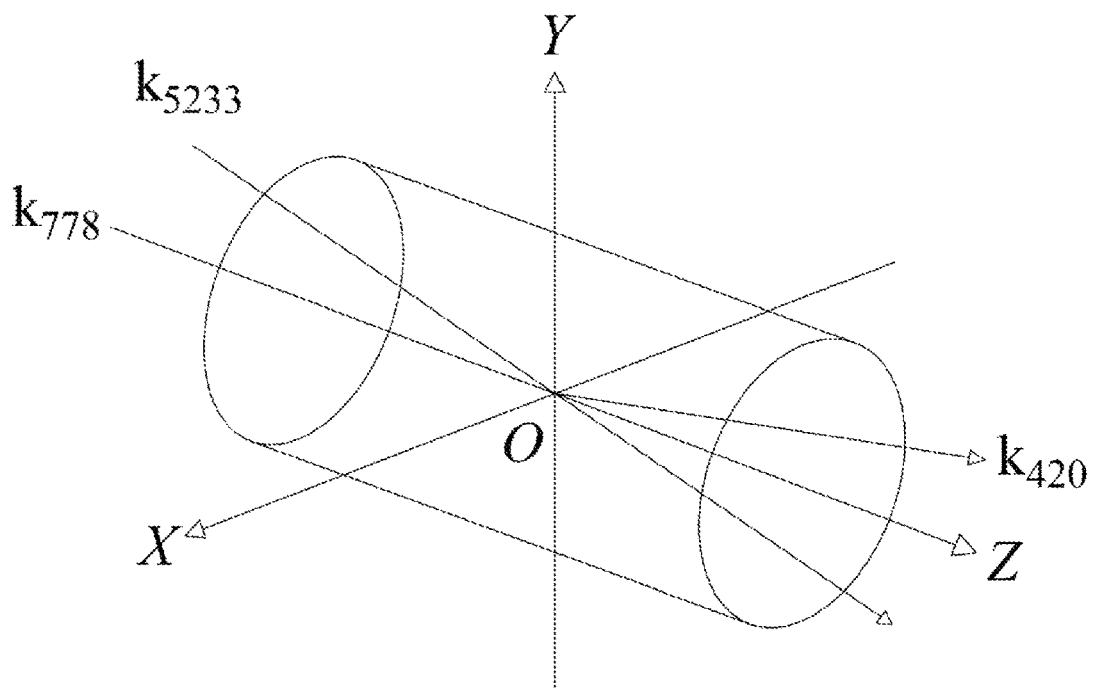
FIG. 2 is a schematic diagram of a position relationship between beams in a three-dimensional coordinate system according to an embodiment of the present disclosure.

FIG. 2 is a schematic diagram of a position relationship between beams, in which directions of wave vectors $k_{778}$, $k_{5233}$ and $k_{420}$ are shown. $k_{778}$ represents the wave vector of the pump light, $k_{5233}$ represents the wave vector of the target mid-infrared laser light, and $k_{420}$ represents the wave vector of the 420 nm beam to be measured that is induced by the target mid-infrared laser light during the second frequency conversion process. The reference beam generated during the first frequency conversion process is in the same direction as the pump light.

The frequency conversion process needs to meet both energy conservation and phase matching conditions. Therefore, based on the energy conservation of the second frequency conversion process, there is:

$$v_{778} + v_{778} = v_{5233} + v_{420}, \quad (1)$$

where $v_{778}$, $v_{5233}$ and $v_{420}$ represent frequencies of laser light with wavelengths of 778 nm, 5,233 nm, and 420 nm, respectively. The phase matching conditions are as follows:

$$k_{778} + k_{778} = k_{5233} + k_{420}, \quad (2)$$

where $k_{778}$, $k_{5233}$ and $k_{420}$ represent wave vectors of laser light with wavelengths of 778 nm, 5,233 nm, and 420 nm, respectively, the wave vector $$k = \frac{2\pi}{\lambda},$$

and $\lambda$ is a corresponding wavelength.

Figure 3:
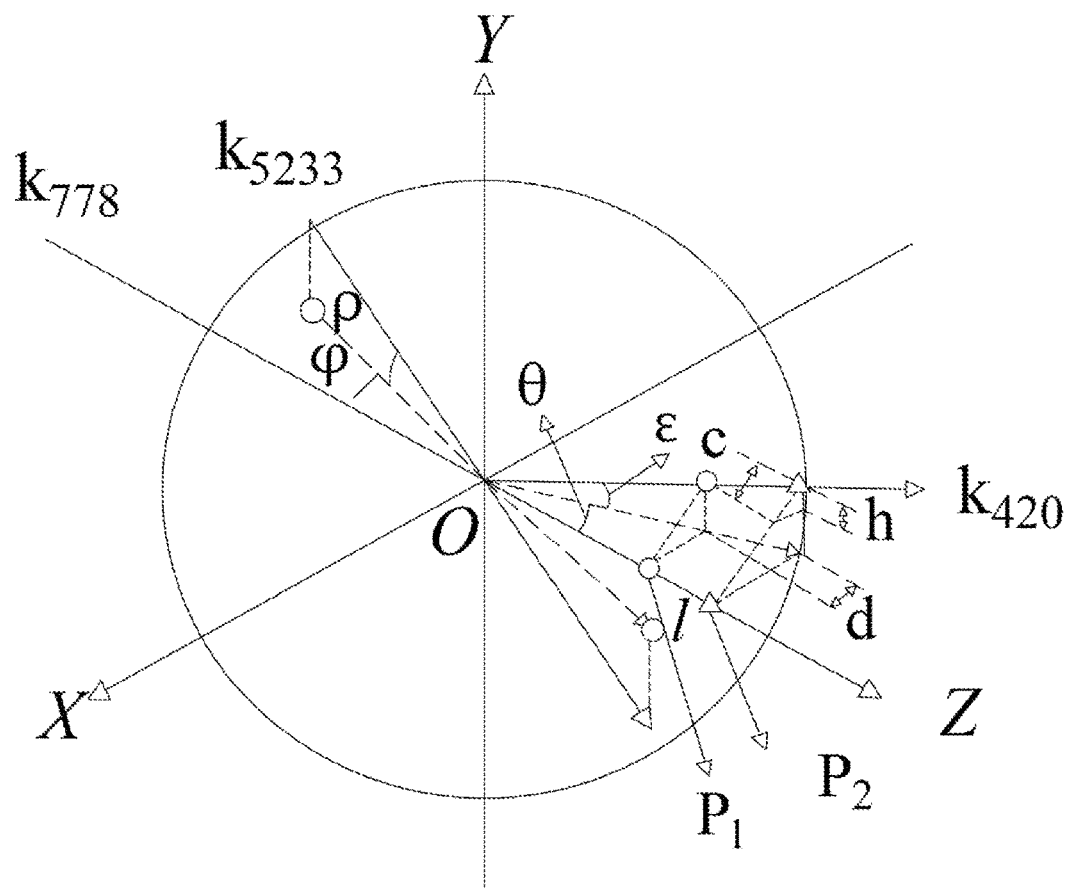
FIG. 3 is a schematic diagram of a beam wave-vector relation in a polar coordinate system.

With an intersection O of the target mid-infrared laser light 4 and the pump light in the atomic gas cell as an origin and the optical axis being the Z-axis, an XYZ three-dimensional coordinate system is established, as shown in FIG. 3. The azimuth angle and the elevation angle of the target mid-infrared laser light 4 in a polar coordinate system are φ and ρ, respectively, and a wave vector component of the target mid-infrared laser light in an XOZ reference plane is $k_{5233}$ cos ρ. The azimuth angle and the elevation angle of the 420 nm beam to be measured in the polar coordinate system are θ and ε, respectively, and a wave vector component of the beam to be measured in the XOZ reference plane is $k_{420}$ cos ε.

As shown in FIG. 3, the azimuth angle θ and the elevation angle ε of the beam to be measured in the XOZ reference plane are respectively:

$$\theta = \arctan d/l; \text{ and} \quad (3)$$

$$\varepsilon = \arctan\frac{\sin\theta h}{d}, \quad (4)$$

where l represents a displacement of the beam mass spectrometer 8 during the two measurements, and is also equal to the displacement of the displacement platform 7; and d and h represent displacements of the beam to be measured in an X direction and a Y direction relative to the reference beam in the spot images obtained by the two measurements, respectively. $P_1$ and $P_2$ represent positions of the beam mass spectrometer 8 during the two measurements.

Figure 4:
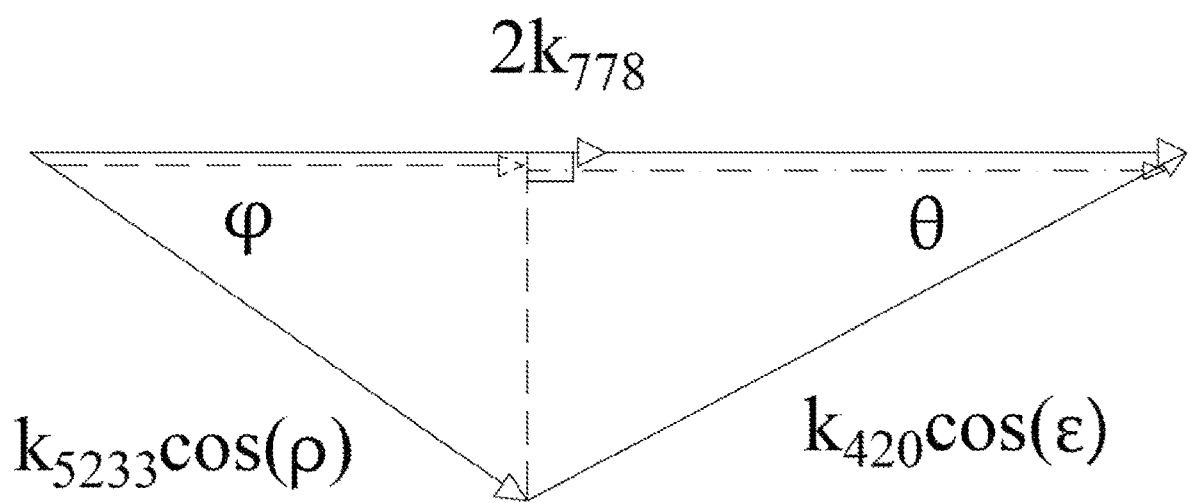
FIG. 4 is a schematic diagram of a relationship between beam wave vector components in an XOZ reference plane.

In the XOZ reference plane, a relationship between wave vector components of the pump light, the target mid-infrared laser light, the beam to be measured and the reference beam is shown in FIG. 4, which satisfies the following relationship:

$$(k_{5233}\cos\rho)^2 = (2k_{778})^2 + (k_{420}\cos\varepsilon)^2 - 2(2k_{778})*k_{420}\cos\varepsilon\cos\theta; \text{ and} \quad (5)$$

$$(k_{420}\cos\varepsilon)^2 = (2k_{778})^2 + (k_{5233}\cos\rho)^2 - 2(2k_{778})k_{5233}\cos\rho\cos\varphi. \quad (6)$$

Therefore, formulas (3) and (4) are substituted into formulas (5) and (6) to obtain the following:

$$\left(\frac{2\pi}{\lambda_{5233}}\cos\rho\right)^2 = \left(2\frac{2\pi}{\lambda_{778}}\right)^2 + \left(\frac{2\pi}{\lambda_{420}}\cos\left(\arctan\frac{\sin\theta h}{d}\right)\right)^2 - \\ 2\left(2\frac{2\pi}{\lambda_{778}}\right)\frac{2\pi}{\lambda_{420}}\cos\left(\arctan\frac{\sin\theta h}{d}\right)\cos(\arctan d/l); \text{ and} \quad (7)$$

$$\left(\frac{2\pi}{\lambda_{420}}\cos\left(\arctan\frac{\sin\theta h}{d}\right)\right)^2 = \\ \left(2\frac{2\pi}{\lambda_{778}}\right)^2 + \left(\frac{2\pi}{\lambda_{5233}}\cos\rho\right)^2 - 4\frac{2\pi}{\lambda_{778}}\frac{2\pi}{\lambda_{5233}}\cos\rho\cos\varphi, \quad (8)$$

where ρ and φ represent the azimuth angle and the elevation angle of the target mid-infrared laser light 4, respectively; $\lambda_{5233}$, $\lambda_{778}$ and $\lambda_{420}$ represent wavelengths of the target mid-infrared laser light 4, the pump light and the beam to be measured, respectively, θ represents the azimuth angle of the beam to be measured, θ=arc tan d/l, l represents displacements of the beam mass spectrometer 8 during the two measurements, and d and h represent displacements of the beam to be measured in an X direction and a Y direction relative to the reference beam in the spot images obtained by the two measurements, respectively. The azimuth angle and the elevation angle of the target mid-infrared laser light are finally determined based on (φ, ρ) calculated by using formulas (5) and (6).

Therefore, the displacement platform 7 accurately controls the beam mass spectrometer 8 to detect at two positions $P_1$ and $P_2$ on the Z-axis, and then the azimuth angle and the elevation angle of the target mid-infrared laser light can be obtained with reference to formulas (7) and (8) by means of a moving distance of the displacement platform and displacements of the beam to be measured in the X direction and the Y direction relative to the reference beam in the spot images obtained by the two measurements.

Figure 5A:
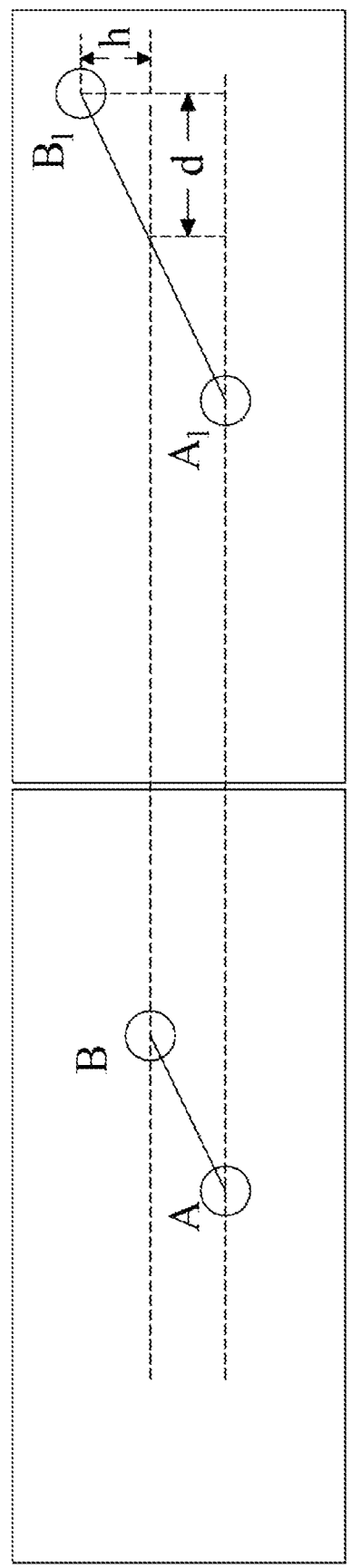
FIGS. 5A-B are schematic diagrams showing measurement signals obtained under two experimental conditions (the diagram only shows the relationship between the spot of the beam to be measured and the position of the spot of the reference beam).

FIG. 5A shows signals of the reference beam and the beam to be measured that are measured by the beam mass spectrometer at the position $P_1$ and $P_2$ on the optical axis, which correspond to A and B, and $A_1$ and $B_1$ in FIG. 5A, respectively. A measured $P_1P_2$ linear distance l=1 cm; in the XOZ reference plane, d=0.0028 cm; in a YOZ reference plane, h=0.0317 cm; in an XOY reference plane, c=0.0318 cm; the obtained azimuth angle of the beam to be measured is θ=arc tan d/l=0.169°, and the obtained elevation angle thereof is $$\varepsilon = \arctan\frac{\sin\theta h}{d} = 1.818°.$$

Finally, by means of formulas (3) and (4), the calculated azimuth angle of the target mid-infrared laser light is φ=2°, and the calculated elevation angle thereof is ρ=1°.

Figure 5B:
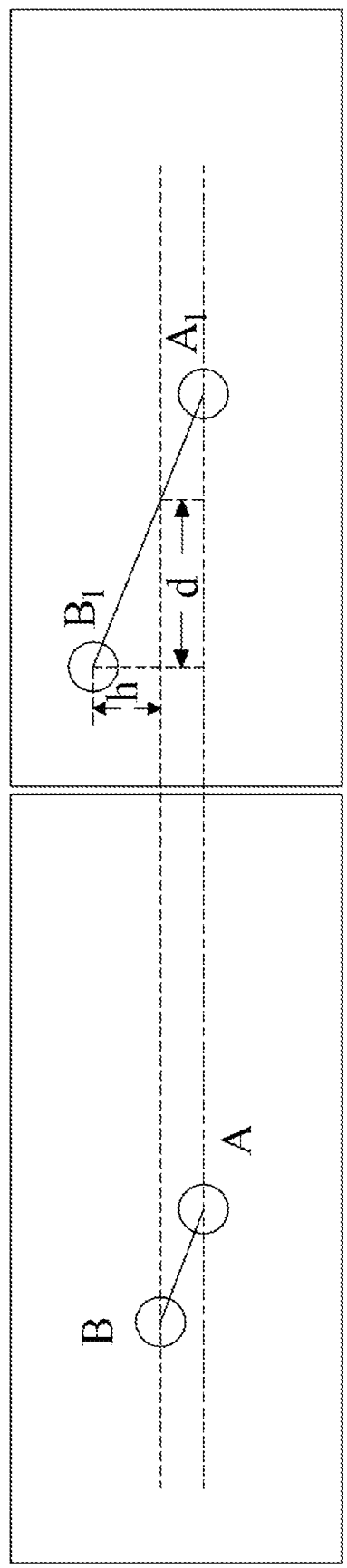

FIG. 5B shows another incident angle of the target mid-infrared laser light. Similarly, measured l=1 cm; d=0.0030 cm, h=0.0328 cm; c=0.0428 cm, the obtained azimuth angle of the beam to be measured is θ=arc tan d/l=0.172°, and the obtained elevation angle thereof is $$\varepsilon = \arctan\frac{\sin\theta h}{d} = 1.879°.$$

Finally, by means of formulas (3) and (4), the calculated azimuth angle of the target mid-infrared laser light is φ=1.980°, and the calculated elevation angle thereof is ρ=0.9460.

Embodiment 2

Embodiment 2 of the present disclosure provides a method for measuring an azimuth angle and an elevation angle of mid-infrared laser light, which is implemented based on the above device according to Embodiment 1, including the following steps.

S1: Place the device on a path of target mid-infrared laser light 4 so that the target mid-infrared laser light 4 and pump light intersect in an atomic gas cell 5.

S2: Obtain spot images of a reference beam and a beam to be measured by a beam mass spectrometer 8.

S3: Move the beam mass spectrometer 8 by means of a displacement platform 7 to obtain spot images of the reference beam and the beam to be measured again.

S4: Calculate an azimuth angle of the beam to be measured based on the spot images obtained twice and a moving distance of the displacement platform 7, and then calculate an azimuth angle and an elevation angle of the target mid-infrared laser light 4 based on the azimuth angle of the beam to be measured, with calculation formulas being formula (7) and formula (8).

In conclusion, the present disclosure provides the device and method for measuring an azimuth angle and an elevation angle of mid-infrared laser light, which can determine the azimuth of the beam to be measured by analyzing the reference beam and the beam to be measured that are detected at two positions on the optical axis, thereby accurately measuring the azimuth angle and the elevation angle of the target mid-infrared laser light. Experimental results prove that the present disclosure has the advantages of low cost, stability, high sensitivity, high precision, and the like. Therefore, the present disclosure is a favorable tool for measuring the azimuth of the mid-infrared laser light.

Finally, it should be noted that the above embodiments are merely intended to describe the technical solutions of the present disclosure, rather than to limit the present disclosure. Although the present disclosure is described in detail with reference to the above embodiments, those of ordinary skill in the art should understand that they may still make modifications to the technical solutions described in the above embodiments or make equivalent replacements to some or all technical features thereof. Such modifications or replacements do not make the essence of the corresponding technical solution depart from the scope of the technical solution of each embodiment of the present disclosure.

What is claimed is:

1. A device for measuring an azimuth angle and an elevation angle of mid-infrared laser light, comprising a laser, an atomic gas cell, a filter, a displacement platform, and a beam mass spectrometer, wherein
pump light generated by the laser enters the atomic gas cell along an optical axis which is a Z-axis, for a spontaneous frequency conversion process, and a generated reference beam enters the beam mass spectrometer through the filter; target mid-infrared laser light and the pump light intersect in the atomic gas cell to induce a second frequency conversion process, and a generated beam to be measured enters the beam mass spectrometer through the filter; and the beam mass spectrometer is arranged on the displacement platform and is configured to move along the optical axis which is the Z-axis under driving of the displacement platform, and simultaneously detect spot images of the reference beam and the beam to be measured at different positions, respectively.

2. The device for measuring an azimuth angle and an elevation angle of mid-infrared laser light according to claim 1, further comprising a calculation unit, wherein the calculation unit is configured to calculate an azimuth angle and an elevation angle of the target mid-infrared laser light based on displacements of the beam to be measured in an X direction and a Y direction relative to the reference beam in the spot images at different positions of the optical axis.

3. The device for measuring an azimuth angle and an elevation angle of mid-infrared laser light according to claim 2, further comprising a display screen configured to display a measured spot image and calculated azimuth angle and elevation angle information of the mid-infrared laser light.

4. The device for measuring an azimuth angle and an elevation angle of mid-infrared laser light according to claim 1, wherein formulas for calculating the azimuth angle and the elevation angle of the target mid-infrared laser light are as follows:

$$\left(\frac{2\pi}{\lambda_{5233}}\cos\rho\right)^2 = \left(2\frac{2\pi}{\lambda_{778}}\right)^2 + \left(\frac{2\pi}{\lambda_{420}}\cos\left(\arctan\frac{\sin\theta h}{d}\right)\right)^2 -$$
$$2\left(2\frac{2\pi}{\lambda_{778}}\right)\frac{2\pi}{\lambda_{420}}\cos\left(\arctan\frac{\sin\theta h}{d}\right)\cos(\arctan d/l);$$

and $$\left(\frac{2\pi}{\lambda_{420}}\cos\left(\arctan\frac{\sin\theta h}{d}\right)\right)^2 =$$
$$\left(2\frac{2\pi}{\lambda_{778}}\right)^2 + \left(\frac{2\pi}{\lambda_{5233}}\cos\rho\right)^2 - 4\frac{2\pi}{\lambda_{778}}\frac{2\pi}{\lambda_{5233}}\cos\rho\cos\varphi,$$

wherein $\rho$ and $\varphi$ represent the azimuth angle and the elevation angle of the target mid-infrared laser light (4), respectively; $\lambda_{5233}$, $\lambda_{778}$ and $\lambda_{420}$ represent wavelengths of the target mid-infrared laser light (4), the pump light and the beam to be measured, respectively, $\theta$ represents an azimuth angle of the beam to be measured, $\theta$=arc tan d/l, l represents displacements of the beam mass spectrometer during the two measurements, and d and h represent displacements of the beam to be measured in the X direction and the Y direction relative to the reference beam in the spot images obtained by the two measurements, respectively.

5. The device for measuring an azimuth angle and an elevation angle of mid-infrared laser light according to claim 1, further comprising a half-wave plate and a polarizing beam splitter, wherein the half-wave plate and the polarizing beam splitter form an adjustable beam-splitting device configured to adjust an intensity of the pump light entering the atomic gas cell.

6. The device for measuring an azimuth angle and an elevation angle of mid-infrared laser light according to claim 1, wherein the pump light has a wavelength of 778 nm, the reference beam and the beam to be measured have a wavelength of 420 nm, the target mid-infrared laser light has a wavelength of 5,233 nm, and atoms in the atomic gas cell are rubidium atoms.

7. The device for measuring an azimuth angle and an elevation angle of mid-infrared laser light according to claim 6, wherein the filter has a central wavelength of 420 nm and a bandwidth of 10 nm.

8. A method for measuring an azimuth angle and an elevation angle of mid-infrared laser light, which is implemented based on the device according to claim 1, comprising the following steps:
S1: placing the device on a path of target mid-infrared laser light so that the target mid-infrared laser light and pump light intersect in the atomic gas cell;
S2: obtaining spot images of a reference beam and a beam to be measured by the beam mass spectrometer;
S3: moving the beam mass spectrometer by the displacement platform to obtain spot images of the reference beam and the beam to be measured again; and
S4: calculating an azimuth angle of the beam to be measured based on the spot images obtained twice and a moving distance of the displacement platform, and then calculating an azimuth angle and an elevation angle of the target mid-infrared laser light based on the azimuth angle of the beam to be measured, with calculation formulas as follows:

$$\left(\frac{2\pi}{\lambda_{5233}}\cos\rho\right)^2 = \left(2\frac{2\pi}{\lambda_{778}}\right)^2 + \left(\frac{2\pi}{\lambda_{420}}\cos\left(\arctan\frac{\sin\theta h}{d}\right)\right)^2 -$$
$$2\left(2\frac{2\pi}{\lambda_{778}}\right)\frac{2\pi}{\lambda_{420}}\cos\left(\arctan\frac{\sin\theta h}{d}\right)\cos(\arctan d/l);$$

and $$\left(\frac{2\pi}{\lambda_{420}}\cos\left(\arctan\frac{\sin\theta h}{d}\right)\right)^2 =$$
$$\left(2\frac{2\pi}{\lambda_{778}}\right)^2 + \left(\frac{2\pi}{\lambda_{5233}}\cos\rho\right)^2 - 4\frac{2\pi}{\lambda_{778}}\frac{2\pi}{\lambda_{5233}}\cos\rho\cos\varphi,$$

wherein $\rho$ and $\varphi$ represent the azimuth angle and the elevation angle of the target mid-infrared laser light (4), respectively; $\lambda_{5233}$, $\lambda_{778}$ and $\lambda_{420}$ represent wavelengths of the target mid-infrared laser light (4), the pump light and the beam to be measured, respectively, $\theta$ represents the azimuth angle of the beam to be measured, $\theta$=arc tan d/l, l represents displacements of the beam mass spectrometer (8) during the two measurements, and d and h represent displacements of the beam to be measured in an X direction and a Y direction relative to the reference beam in the spot images obtained by the two measurements, respectively.

* * * * *